US012466431B2

(12) United States Patent
Zheng et al.

(10) Patent No.: US 12,466,431 B2
(45) Date of Patent: Nov. 11, 2025

(54) USING SLICED DATA TO EVALUATE MACHINE LEARNING MODELS USED FOR AUTONOMOUS VEHICLE OPERATION

(71) Applicant: GM Cruise Holdings LLC, San Francisco, CA (US)

(72) Inventors: Shuai Zheng, Santa Clara, CA (US); Amirreza Shaban, Bellevue, WA (US); Sachithra Hemachandra, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 196 days.

(21) Appl. No.: 18/321,477

(22) Filed: May 22, 2023

(65) Prior Publication Data
US 2024/0391487 A1   Nov. 28, 2024

(51) Int. Cl.
*B60W 60/00*   (2020.01)
*G06N 20/00*   (2019.01)

(52) U.S. Cl.
CPC .......... *B60W 60/001* (2020.02); *G06N 20/00* (2019.01); *B60W 2555/20* (2020.02)

(58) Field of Classification Search
CPC . B60W 60/001; B60W 2555/20; G06N 20/00
See application file for complete search history.

(56) References Cited

U.S. PATENT DOCUMENTS

| | | | |
|---|---|---|---|
| 11,801,861 B2 * | 10/2023 | Choe | G06N 3/08 |
| 2014/0303884 A1 * | 10/2014 | Levien | G08G 5/80 |
| | | | 701/301 |
| 2018/0233061 A1 * | 8/2018 | Rozenberg | G09B 9/12 |
| 2018/0275658 A1 * | 9/2018 | Iandola | G06F 30/20 |
| 2019/0318050 A1 * | 10/2019 | Zapolsky | G06F 11/3698 |
| 2021/0073584 A1 * | 3/2021 | St. Romain, II | G06N 5/04 |
| 2021/0231440 A1 * | 7/2021 | Jadhav | G06V 20/20 |
| 2022/0122001 A1 * | 4/2022 | Choe | G06N 20/20 |
| 2022/0198295 A1 * | 6/2022 | Singla | G06N 20/00 |
| 2024/0144098 A1 * | 5/2024 | Wang | G01S 13/878 |
| 2024/0362454 A1 * | 10/2024 | Nakayama | G06N 3/042 |

* cited by examiner

Primary Examiner — Rami Khatib
(74) Attorney, Agent, or Firm — CANTOR COLBURN LLP

(57) ABSTRACT

Machine learning models for controlling AV operations may be evaluated based on sliced data. A feature category critical for an environmental condition may be identified. The environmental condition is a condition in an environment where an AV performs an operation. A sub-dataset, which comprises sensor data capturing the environmental feature dataset, may be extracted from a dataset that comprises sensor data capturing the environment. The sub-dataset may be input into machine learning models that can classify the feature category. Performances of the machine learning models can be evaluated based on their outputs, which are generated based on the sub-dataset, and a ground-truth classification of the environmental feature. The output of each machine learning model comprises a classification of the environmental feature. A machine learning model may be selected based on the evaluated performances of the machine learning models and may be used to control driverless operations of AVs.

20 Claims, 6 Drawing Sheets

USING SLICED DATA TO EVALUATE MACHINE LEARNING MODELS USED FOR AUTONOMOUS VEHICLE OPERATION

TECHNICAL FIELD OF THE DISCLOSURE

The present disclosure relates generally to autonomous vehicle (AV) and, more specifically, to using sliced data to evaluate machine learning models that are used for AV operations.

BACKGROUND

An AV is a vehicle that is capable of sensing and navigating its environment with little or no user input. An AV may sense its environment using sensing devices such as Radio Detection and Ranging (RADAR), Light Detection and Ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to navigate the vehicle. As used herein, the phrase "AV" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure (FIG. 1 illustrates a system including a fleet of AVs that can provide services to users, according to some embodiments of the present disclosure.

DESCRIPTION OF EXAMPLE EMBODIMENTS OF THE DISCLOSURE

Overview

Figure 1:
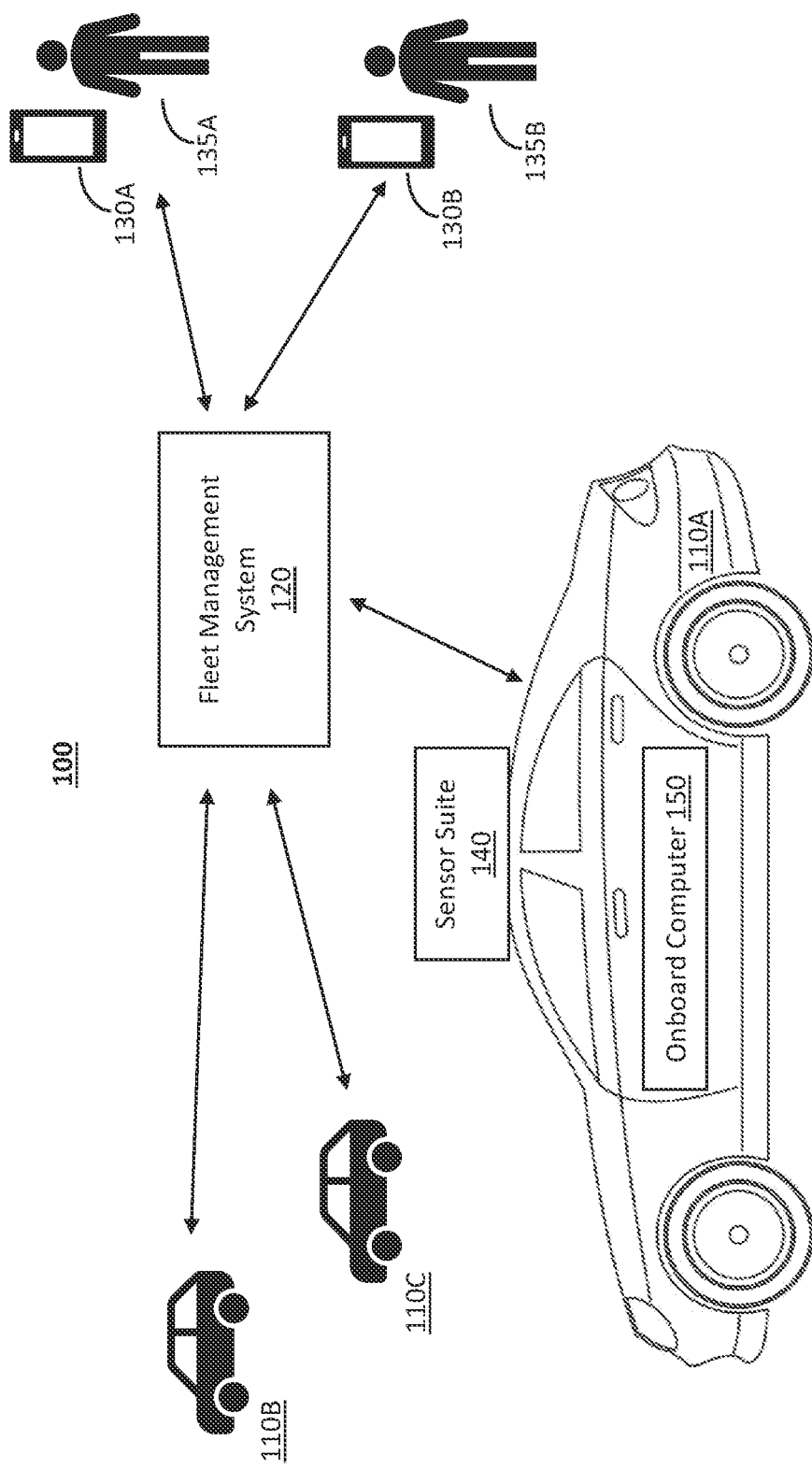

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

AVs can provide driverless services, such as ride services, delivery services, and so on. A person can request an AV to pick him/her up from a location and drop him/her off at another location. With the autonomous driving features of the AV, the person does not have to drive during the ride and can be a passenger of the AV. The AV can navigate from the pick-up location to the drop-off location with no or little user input. AVs can provide other driverless services too, such as delivery service. A person can request an AV to deliver one or more items from one location to another location, and the person does not have to drive or be a passenger of the AV for the delivery.

Driverless operations of AVs usually rely on models that have been trained with machine learning technologies. Such models are referred to as AV control models or control models. An AV control model may receive an input dataset, which may include sensor data captured by the AV, and output data to be used for control operational behaviors of AVs. Operational behaviors of AVs are also referred to as AV operational behaviors, behaviors of AVs, or AV behaviors. Examples of AV behaviors include detection (e.g., detections by sensors), perception (identification of objects detected by sensors), prediction, localization, planning, navigation, interaction with passenger, interaction with other objects (e.g., non-passenger people, other vehicles, traffic signs, etc.), and so on.

Operational behaviors of the AV in an environment where the AV operates are usually influenced by conditions in the environment ("environmental conditions"). Examples of environmental conditions include actions of pedestrians, actions of other vehicles, actions of animals, weather, traffic conditions, and so on. An AV control model can perceive or predict environmental conditions and control AV behaviors based on the perception or prediction. For instance, the AV can capture sensor data of environmental features and input the sensor data into a control model, and the control model can perceive or predict one or more environmental conditions based on the sensor data. An environmental feature may be a feature of an object that is associated with the environmental condition, such as an object triggering the environmental condition, an object participating in the environmental condition, an object impacted by the environmental condition, and so on. Operational behaviors of an AV may be controlled by multiple control models or a control model including multiple trained models. For instance, an environmental condition may be detected or predicted based on outputs of multiple classifiers, each of which may classify a particular type of environmental features.

In an example, an AV may predict that a pedestrian is about to cross a street where the AV is driving based on detection of features of the pedestrian. Example features of the pedestrian may include gaze of the pedestrian (e.g., gaze at the AV or another vehicle driving on the street), gesture of the pedestrian, orientation of the pedestrian, or other features. The features of the pedestrian may be detected by one or more sensors of the AV. A control model may determine the pedestrian's intention to cross the street or predict that the pedestrian would cross the street based on sensor data from the one or more sensors. The control model or another control model may further plan one or more behaviors of the AV. For instance, the control model may output a control signal for stop. The control signal may control the motor of the AV and cause the AV to stop.

However, given randomness in model training or sub-training, various AV control models can be generated. The performances of different AV control models can vary. It has been a challenge to effectively evaluate different AV control models and find the one that has the best performance, as an AV control model that is good at perceiving or predicting a type of environment condition may not be as good at perceiving or predicting a different type of environment condition. Therefore, improved technologies for evaluating AV control models are needed.

Embodiments of the present disclosure provide a model evaluation platform that can evaluate AV control models, which have been trained using machine learning techniques for controlling AV operations, based on sliced data. The model evaluation platform can identify a category of environmental features that are critical for detecting or predicting an environmental condition that would influence one or more AV behaviors. An environmental feature may be critical for an environmental condition when the detection of the environmental feature is important or necessary for detecting or predicting the environmental condition. The model evaluation platform can further slice an input dataset into sub-datasets and use one of the sub-datasets to evaluate AV control models used for detecting or predicting the environmental condition. The model evaluation platform may also use another sub-dataset to evaluate control models used for detecting or predicting another environmental condition. With the slice and dice approach, the evaluation In various embodiments of the present disclosure, a visual feature that is critical for an environmental condition associated with a vehicle may be identified. A sub-dataset, which comprises sensor data capturing the visual feature dataset, may be extracted from a dataset that comprises sensor data capturing the environment. In an example where the environmental condition is a pedestrian crossing a traffic lane where an AV is located, the visual feature may be the gaze of the pedestrian, the gesture of the pedestrian, and so on. The sub-dataset may include sensor data captured by the AV within a threshold distance from the pedestrian. The sub-dataset may be input into different trained models. The trained models may have been trained to classify a feature category that the visual feature falls into. A trained model may be an AV control model or part of an AV control model. Performances of the trained models can be evaluated based on a ground-truth classification of the visual feature and outputs of the plurality of trained models. Each output is generated by a respective trained model based on the sub-dataset and comprises a classification of the visual feature. The performance evaluation may be based on multiple sub-datasets extracted from different datasets, e.g., datasets including sensor data captured by different AVs. A trained model may be selected from the evaluated trained models based on the evaluated performances. The selected trained model may be used to control AV behaviors during driverless operations of AVs. The confidence of the selected trained model in classifying the feature category may be calibrated based on the performance evaluation.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example System with AV Fleet

FIG. 1 illustrates a system 100 including a fleet of AVs that can provide services to users, according to some embodiments of the present disclosure. The system 100 includes AVs 110A-110C (collectively referred to as "AVs 110" or "AV 110"), a fleet management system 120, and client devices 130A and 130B (collectively referred to as "client devices 130" or "client device 130"). The client devices 130A and 130B are associated with users 135A and 135B, respectively. The AV 110A includes a sensor suite 140 and an onboard computer 150. Even though not shown in FIG. 1, the AV 110B or 110C can also include a sensor suite 140 and an onboard computer 150. In other embodiments, the system 100 may include more, fewer, or different components. For example, the fleet of AVs 110 may include a different number of AVs 110 or a different number of client devices 130.

The fleet management system 120 manages the fleet of AVs 110. The fleet management system 120 may manage one or more services that the fleet of AVs 110 provides to the users 135. An example service is a ride service, e.g., an AV 110 provides a ride to a user 135 from a first location to a second location. Another example service is a delivery service, e.g., an AV 110 delivers one or more items from or to the user 135. The fleet management system 120 can select one or more AVs 110 (e.g., AV 110A) to perform a particular service, and instructs the selected AV to drive to one or more particular locations associated with the service (e.g., a first address to pick up user 135A, and a second address to pick up user 135B). The fleet management system 120 also manages fleet maintenance tasks, such as fueling, inspecting, and servicing of the AVs. As shown in FIG. 1, the AVs 110 communicate with the fleet management system 120. The AVs 110 and fleet management system 120 may connect over a network, such as the Internet.

In some embodiments, the fleet management system 120 receives service requests for the AVs 110 from the client devices 130. In an example, the user 135A accesses an app executing on the client device 130A and requests a ride from a pickup location (e.g., the current location of the client device 130A) to a destination location. The client device 130A transmits the ride request to the fleet management system 120. The fleet management system 120 selects an AV 110 from the fleet of AVs 110 and dispatches the selected AV 110A to the pickup location to carry out the ride request. In some embodiments, the ride request further includes a number of passengers in the group. In some embodiments, the ride request indicates whether a user 135 is interested in a shared ride with another user traveling in the same direction or along a same portion of a route. The ride request, or settings previously entered by the user 135, may further indicate whether the user 135 is interested in interaction with another passenger.

The fleet management system 120 may provide the AVs 110 information for navigating the AVs 110 during the operations of the AVs. For instance, the fleet management system 120 may provide maps (e.g., semantic maps, vector maps, etc.) of environments where AVs operate. The fleet management system 120 may also provide control models that can be used for controlling AV operations. The fleet management system 120 may train such control models using machine learning techniques. The fleet management system 120 may also evaluate performance of control models based on sliced data. The performance evaluation may be used to select one or more control models to be provided to AVs. Certain aspects of the fleet management system 120 are described further in relation to FIG. 2.

A client device 130 is a device capable of communicating with the fleet management system 120, e.g., via one or more networks. The client device 130 can transmit data to the fleet management system 120 and receive data from the fleet management system 120. The client device 130 can also receive user input and provide output. In some embodiments, outputs of the client devices 130 are in human-perceptible forms, such as text, graphics, audio, video, and so on. The client device 130 may include various output components, such as monitors, speakers, headphones, projectors, and so on. The client device 130 may be a desktop or a laptop computer, a smartphone, a mobile telephone, a personal digital assistant (PDA), or another suitable device.

In some embodiments, a client device 130 executes an application allowing a user 135 of the client device 130 to interact with the fleet management system 120. For example, a client device 130 executes a browser application to enable interaction between the client device 130 and the fleet management system 120 via a network. In another embodiment, a client device 130 interacts with the fleet management system 120 through an application programming interface (API) running on a native operating system of the client device 130, such as IOS® or ANDROID™. The application may be provided and maintained by the fleet management system 120. The fleet management system 120 may also update the application and provide the update to the client device 130.

In some embodiments, a user 135 may submit service requests to the fleet management system 120 through a client device 130. A client device 130 may provide its user 135 a user interface (UI), through which the user 135 can make service requests, such as ride request (e.g., a request to pick up a person from a pickup location and drop off the person at a destination location), delivery request (e.g., a request to delivery one or more items from a location to another location), and so on. The UI may allow users 135 to provide locations (e.g., pickup location, destination location, etc.) or other information that would be needed by AVs 110 to provide services requested by the users 135.

The client device 130 may provide the user 135 an UI through which the user 135 can interact with the AV 110 that provides a ride to the user 135. The AV 110 may transmit one or more messages to the UI The messages may be associated with one or more behaviors performed by the AV 110 for providing the ride to the user 135. The user 135 may view the messages in the UI The UI may also allow the user 135 to interact with the messages. In some embodiments, the UI allows the user 135 to provide a comment or rate on the AV behaviors or the ride. The UI may also allow the user 135 to modify one or more settings of the ride in light of the AV behaviors.

The client device 130 may also provide the user 135 an UI through which the user 135 can interact with the fleet management system 120. For instance, the UI enables the user to submit a request for assistance to the fleet management system 120 through a network or a telephone service (e.g., a customer service hotline). The UI can further facilitate a communication between the user 135 and an agent of the fleet management system 120 who can provide the requested assistance. The UI may further enable the user to comment on or rate the agent.

The AV 110 is preferably a fully autonomous automobile, but may additionally or alternatively be any semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The sensor suite 140 may include a computer vision ("CV") system, localization sensors, and driving sensors. For example, the sensor suite 140 may include interior and exterior cameras, RADAR sensors, sonar sensors, LIDAR sensors, thermal sensors, wheel speed sensors, inertial measurement units (IMUs), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. Certain sensors of the sensor suite 140 are described further in relation to FIG. 4.

The onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls behavior of the AV 110. The onboard computer 150 may be preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

In some embodiments, the onboard computer 150 is in communication with the fleet management system 120, e.g., through a network. The onboard computer 150 may receive instructions from the fleet management system 120 and control behavior of the AV 110 based on the instructions. For example, the onboard computer 150 may receive from the fleet management system 120 an instruction for providing a ride to a user 135. The instruction may include information of the ride (e.g., pickup location, drop-off location, intermediate stops, etc.), information of the user 135 (e.g., identifying information of the user 135, contact information of the user 135, etc.). The onboard computer 150 may determine a navigation route of the AV 110 based on the instruction. As another example, the onboard computer 150 may receive from the fleet management system 120 a request for sensor data to be used by the ride evaluation platform. The onboard computer 150 may control one or more sensors of the sensor suite 140 to detect the user 135, the AV 110, or an environment surrounding the AV 110 based on the instruction and further provide the sensor data from the sensor suite 140 to the fleet management system 120. The onboard computer 150 may transmit other information requested by the fleet management system 120, such as perception of the AV 110 that is determined by a perception module of the onboard computer 150, historical data of the AV 110, and so on.

The onboard computer 150 may receive one or more control models from the fleet management system 120. The onboard computer 150 may deploy the control models for controlling the AV 110. In some embodiments, an inference of a control model may be run by the onboard computer 150. The onboard computer 150 may further train the control model or fine tune the control model before the inference is conducted. In other embodiments, an inference of a control model may be run by the fleet management system 120, and the onboard computer 150 receives output of the control model from the fleet management system 120. Certain aspects of the onboard computer 150 are described further in relation to FIG. 5.

Example Fleet Management System

Figure 2:
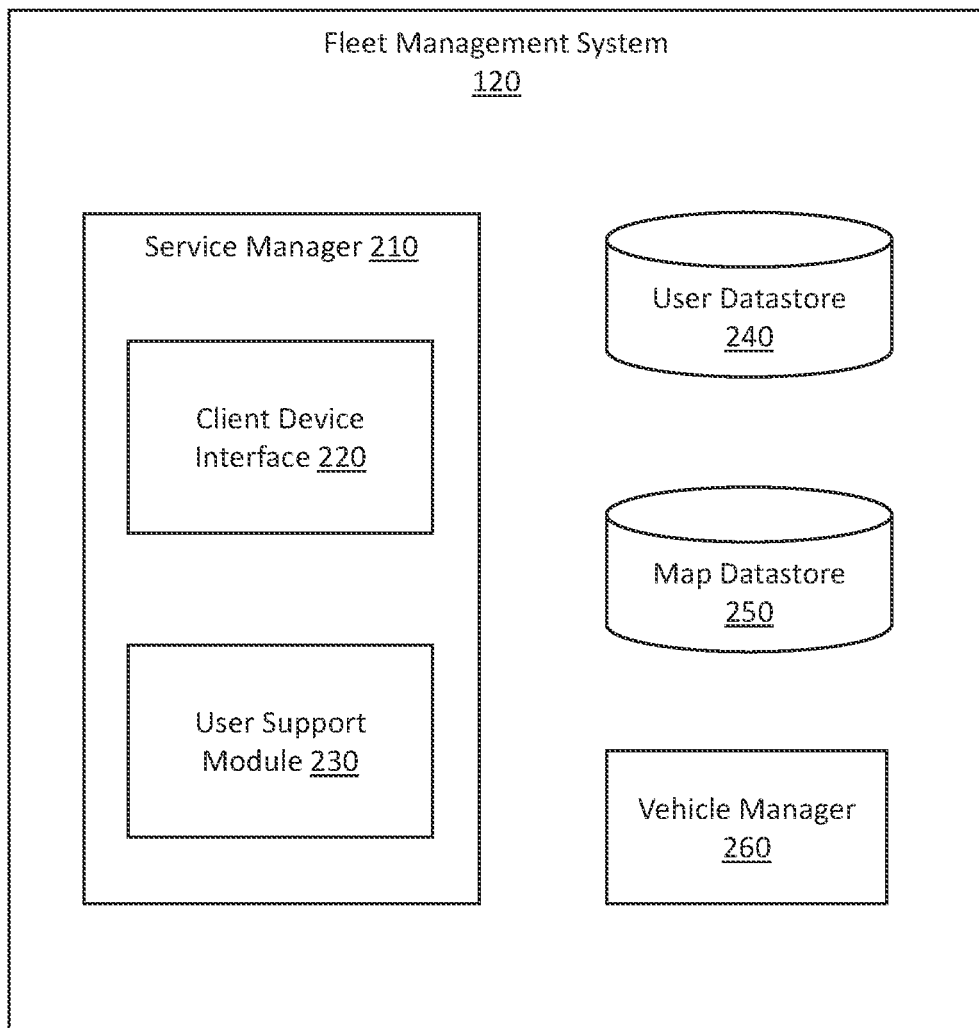
FIG. 2 is a block diagram showing a fleet management system, according to some embodiments of the present disclosure.

FIG. 2 is a block diagram showing the fleet management system, according to some embodiments of the present disclosure. The fleet management system 120 includes a service manager 210, a user datastore 240, a map datastore 250, and a vehicle manager 260. In alternative configurations, different and/or additional components may be included in the fleet management system 120. Further, functionality attributed to one component of the fleet management system 120 may be accomplished by a different component included in the fleet management system 120 or a different system than those illustrated, such as the onboard computer 150.

The service manager 210 manages services that the fleet of AVs 110 can provide. The service manager 210 includes a client device interface 220 and a user support module 230. The client device interface 220 provides interfaces to client devices, such as headsets, smartphones, tablets, computers, and so on. For example, the client device interface 220 may provide one or more apps or browser-based interfaces that can be accessed by users, such as the users 135, using client devices, such as the client devices 130. The client device interface 220 enables the users to submit requests to a ride service provided or enabled by the fleet management system 120. In particular, the client device interface 220 enables a user to submit a ride request that includes an origin (or pickup) location and a destination (or drop-off) location. The ride request may include additional information, such as a number of passengers traveling with the user, and whether or not the user is interested in a shared ride with one or more other passengers not known to the user.

The client device interface 220 can also enable users to select ride settings. The client device interface 220 can provide one or more options for the user to engage in a virtual environment, such as whether to interact with another person, whether to involve in an entertainment activity, and so on. The client device interface 220 may enable a user to opt-in to some, all, or none of the virtual activities offered by the ride service provider. The client device interface 220 may further enable the user to opt-in to certain monitoring features, e.g., to opt-in to have the interior sensors 440 obtain sensor data of the user. The client device interface 220 may explain how this data is used by the service manager 210 (e.g., for providing support to the user, etc.) and may enable users to selectively opt-in to certain monitoring features, or to opt-out of all of the monitoring features. In some embodiments, the user support platform may provide a modified version of a virtual activity if a user has opted out of some or all of the monitoring features.

The user support module 230 may receive support requests from passengers of AVs through the client device interface 220 or the onboard computer 150. The user support module 230 manages the support requests. In some embodiments, the user support module 230 maintains a queue of pending support requests, in which the pending support requests may be arranged in an order. A pending support request is a support request that has not been completed. A support request may be considered completed after the support requested by the passenger has been provided or the issue that triggered the support request has been resolved.

The user support module 230 may assign the pending support requests to agents based on the order in the queue. The agent can interact with the passenger and provide support to the passenger. An agent may be associated with a device in communication with the user support module 230. The device may be a desktop or a laptop computer, a smartphone, a mobile telephone, a PDA, or another suitable device. The user support module 230 may send information related to support requests assigned to the agent to the agent's device. The information may include the support requests and guidance on how to provide the requested support.

In some embodiments, the user support module 230 determines a state (e.g., a sentiment) of a passenger who submitted a support request and processes the support request based on the passenger's state. The user support module 230 may determine the passenger's state based on data of the passenger, data of the AV, data of one or more objects in an environment surrounding the passenger or AV, or some combination thereof. The data may include sensor data generated by the sensor suite 140 from detecting the passenger, AV, one or more objects in the environment, or some combination thereof. For instance, the user support module 230 may interface with AVs 110 (e.g., with onboard computers of the AVs 110) and receive sensor data from the AVs 110. The sensor data may be camera images, captured sound, measured temperature, other outputs from the sensor suite 140, or some combination thereof. The data may also include data retrieved by the user support module 230 from the user datastore 240 or map datastore 250. In an embodiment, the user support module 230 may provide the data to a trained model and the train model analyzes the sentiment of the passenger. The trained model may classify the passenger's sentiment. Example categories include negative (e.g., anxious, angry, etc.), neural (e.g., calm), positive (e.g., confident, happy, etc.), and so on. The trained model may also estimate a degree of the passenger's sentiment, such as an anxiety level or anger level.

The user support module 230 may assign the support request to an agent based on the passenger's state. For instance, based on a determination that the passenger is anxious, the user support module 230 may assign the support request to a currently available agent or the next available agent so that the waiting time of the passenger can be minimized. The agent, who receives the support request, can help the passenger to deal with the issue. The agent may communicate with the passenger, e.g., through an audio or video call.

The user datastore 240 stores ride information associated with users of the ride service, e.g., the users 135. In some embodiments, the user datastore 240 stores user sentiments associated with rides taken by the user 135. The user sentiments may be determined by the user support module 230. The user datastore 240 may store an origin location and a destination location for a user's current ride. The user datastore 240 may also store historical ride data for a user, including origin and destination locations, dates, and times of previous rides taken by a user. The historical data of the user may also include information associated with historical support requests made by the user during the previous rides, such as sensor data associated with the historical support requests, communications of the user with agents that serviced the historical support requests, states of the user during the communications, information of AVs 110 associated with the historical support requests, and so on. The historical data of the user may also include information associated with communications of AVs with the user for AV behaviors in historical rides taken by the user. In some cases, the user datastore 240 may further store future ride data, e.g., origin and destination locations, dates, and times of planned rides that a user has scheduled with the ride service provided by the AVs 110 and fleet management system 120. Some or all of the data of a user in the user datastore 240 may be received through the client device interface 220, an onboard computer (e.g., the onboard computer 150), a sensor suite of AVs 110 (e.g., the sensor suite 140), a third-party system associated with the user and the fleet management system 120, or other systems or devices.

In some embodiments, the user datastore 240 also stores data indicating user preferences associated with rides in AVs. The fleet management system 120 may include one or more learning modules (not shown in FIG. 2) to learn user interests based on user data. For example, a learning module may compare locations in the user datastore 240 with map datastore 250 to identify places the user has visited or plans to visit. For example, the learning module may compare an origin or destination address for a user in the user datastore 240 to an entry in the map datastore 250 that describes a building at that address. The map datastore 250 may indicate a building type, e.g., to determine that the user was picked up or dropped off at an event center, a restaurant, or a movie theater. In some embodiments, the learning module may further compare a date of the ride to event data from another data source (e.g., a third-party event data source, or a third-party movie data source) to identify a more particular interest, e.g., to identify a performer who performed at the event center on the day that the user was picked up from an event center, or to identify a movie that started shortly after the user was dropped off at a movie theater. This interest (e.g., the performer or movie) may be added to the user datastore 240. As another example, a learning module may learn user tolerance or preference for AV behaviors, e.g., based on information associated with communications of AVs with the user for AV behaviors in historical rides taken by the user. The learning module may learn that the user has a high tolerance for an AV behavior based on information indicating that the user had no bad feelings for the AV behavior undesirable in one or more previous rides. Similarly, the learning module may learn that the user has a low tolerance for a type of AV behavior based on information indicating that the user had negative sentiments towards the AV behavior in one or more previous rides.

The map datastore 250 stores one or more maps of environments through which the AVs 110 may travel. A map may be a semantic map or vector map. The map datastore 250 includes data describing roadways, such as e.g., locations of roadways, connections between roadways, roadway names, speed limits, traffic flow regulations, toll information, etc. The map datastore 250 may further include data describing buildings (e.g., locations of buildings, building geometry, building types), and data describing other objects (e.g., location, geometry, object type) that may be in the environments of AV 110. The map datastore 250 may also include data describing other features, such as bike lanes, sidewalks, crosswalks, traffic lights, parking lots, signs, billboards, etc.

Some of the map datastore 250 may be gathered by the fleet of AVs 110. For example, images obtained by the exterior sensors 410 of the AVs 110 may be used to learn information about the AVs' environments. As one example, AVs may capture images in a residential neighborhood during a Christmas season, and the images may be processed to identify which homes have Christmas decorations. The images may be processed to identify particular features in the environment. For the Christmas decoration example, such features may include light color, light design (e.g., lights on trees, roof icicles, etc.), types of blow-up figures, etc. The fleet management system 120 and/or AVs 110 may have one or more image processing modules to identify features in the captured images or other sensor data. This feature data may be stored in the map datastore 250. In some embodiments, certain feature data (e.g., seasonal data, such as Christmas decorations, or other features that are expected to be temporary) may expire after a certain period of time. In some embodiments, data captured by a second AV 110 may indicate that a previously-observed feature is no longer present (e.g., a blow-up Santa has been removed) and in response, the fleet management system 120 may remove this feature from the map datastore 250.

The vehicle manager 260 manages and communicates with the fleet of AVs 110. In some embodiments, the vehicle manager 260 provides control models that AVs 110 can use for providing driverless services. The vehicle manager 260 may train models for controlling AV operations. The vehicle manager 260 may further evaluate trained models based on sliced data. For instance, the vehicle manager 260 may identify a feature category that is critical for an environmental condition. The feature category may include one or more environmental features. The environmental condition is a condition in an environment where an AV performs an operation. An environmental feature may be a feature of an object that is associated with the environmental condition, such as an object triggering the environmental condition, an object participating in the environmental condition, an object impacted by the environmental condition, and so on.

The vehicle manager 260 may extract one or more sub-datasets from one or more datasets that comprise sensor data capturing the environment. A sub-dataset may comprise sensor data capturing the one or more environmental features. The vehicle manager 260 may input a sub-dataset into model that have been trained to classify the feature category. The vehicle manager 260 may evaluate performances of the trained models based on their outputs that are generated based on the one or more sub-datasets and a ground-truth classification of each environmental feature. An output of a trained model may indicate a classification of an environmental feature. The vehicle manager 260 may select a trained model based on the evaluated performances of the trained models. The vehicle manager 260 may further calibrate the confidence of the selected trained model in its classification of the one or more environmental features. The vehicle manager 260 may provide the selected trained model to AVs 110 for controlling driverless operations of AVs 110.

In some embodiments, the vehicle manager 260 assigns the AVs 110 to various tasks and directs the movements of the AVs 110 in the fleet. In some embodiments, the vehicle manager 260 includes additional functionalities not specifically shown in FIG. 2. For example, the vehicle manager 260 instructs AVs 110 to drive to other locations while not servicing a user, e.g., to improve geographic distribution of the fleet, to anticipate demand at particular locations, etc. The vehicle manager 260 may also instruct AVs 110 to return to an AV 110 facility for fueling, inspection, maintenance, or storage. As another example, the vehicle manager 260 may include functionalities of the onboard computer 150, such as functionalities related to modeling restricted traffic zones.

In some embodiments, the vehicle manager 260 selects AVs from the fleet to perform various tasks and instructs the AVs to perform the tasks. For example, the vehicle manager 260 receives a ride request from the client device interface 220. The vehicle manager 260 selects an AV 110 to service the ride request based on the information provided in the ride request, e.g., the origin and destination locations. If multiple AVs 110 in the AV 110 fleet are suitable for servicing the ride request, the vehicle manager 260 may match users for shared rides based on an expected compatibility. For example, the vehicle manager 260 may match users with similar user interests, e.g., as indicated by the user datastore 240. In some embodiments, the vehicle manager 260 may match users for shared rides based on previously-observed compatibility or incompatibility when the users had previously shared a ride.

The vehicle manager 260 or another system may maintain or access data describing each of the AVs in the fleet of AVs 110, including current location, service status (e.g., whether the AV 110 is available or performing a service; when the AV 110 is expected to become available; whether the AV 110 is schedule for future service), fuel or battery level, etc. The vehicle manager 260 may select AVs for service in a manner that optimizes one or more additional factors, including fleet distribution, fleet utilization, and energy consumption. The vehicle manager 260 may interface with one or more predictive algorithms that project future service requests and/or vehicle use, and select vehicles for services based on the projections.

The vehicle manager 260 transmits instructions dispatching the selected AVs. In particular, the vehicle manager 260 instructs a selected AV 110 to drive autonomously to a pickup location in the ride request and to pick up the user and, in some cases, to drive autonomously to a second pickup location in a second ride request to pick up a second user. The first and second user may jointly participate in a virtual activity, e.g., a cooperative game or a conversation. The vehicle manager 260 may dispatch the same AV 110 to pick up additional users at their pickup locations, e.g., the AV 110 may simultaneously provide rides to three, four, or more users. The vehicle manager 260 further instructs the AV 110 to drive autonomously to the respective destination locations of the users.

Figure 3:
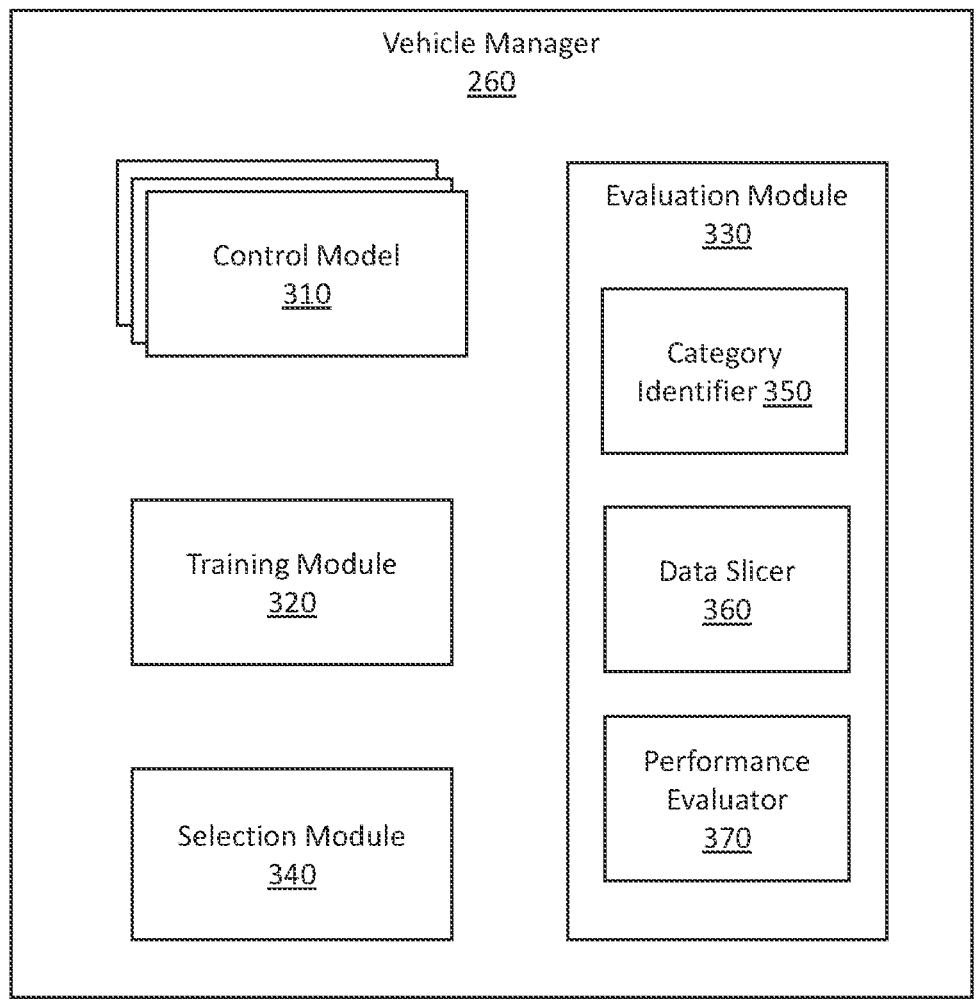
FIG. 3 is a block diagram showing a vehicle manager, according to some embodiments of the present disclosure.

FIG. 3 is a block diagram showing the vehicle manager 260, according to some embodiments of the present disclosure. The vehicle manager 260 includes control models 310 (individually referred to as "control model 310"), a training module 320, an evaluation module 330, and a selection module 340. In alternative configurations, different and/or additional components may be included in the vehicle manager 260. Further, functionality attributed to one component of the vehicle manager 260 may be accomplished by a different component included in the vehicle manager 260, a different component in the fleet management system 120, the onboard computer 150, or a different system or device.

The control models 310 are machine learning models that can control AV behaviors based on environmental conditions. A control model 310 may be trained by the training module 320. In some embodiments, a control model 310 may have a neural network architecture that includes an input layer, a plurality of hidden layers, and an output layers. Different control models 310 or different layers in the same control mode 310 may perform different tasks. For example, different control models 310 (or different layers in the same control mode 310) may control different types of AV behaviors. As another example, different control models 310 or different layers in the same control mode 310) may perceive or predict different types of environmental conditions. In some embodiments, some or all the control models 310 may have been trained to perform the same task(s). For instance, these control models 310 may perform the same classification, perception, prediction, planning, other tasks, or some combination thereof. These control models may have different internal parameters or architectures, due to randomness in training or sub-training processes. The randomness may be caused by epistemic uncertainty, aleatory uncertainty, model uncertainty, and so on.

The training module 320 trains the control models 310. The training module 320 may train a control model 310 by using a training dataset. The training module 320 may form the training dataset. The training dataset may include training samples and training labels. A training sample may include information of one or more environmental features detected by one or more AV sensors. A training sample may be associated with one or more training labels. A training label may include a ground-truth label of an environmental feature, e.g., a ground-truth classification of the environmental feature. A ground-truth label may be a known or verified label. In some embodiments, the training module 320 may form the training dataset by mining one or more operation logs of one or more AVs. Additionally or alternatively, the training module 320 may create simulation data to form the training dataset. For instance, the training module 320 may create a virtual scene that simulates an environment where AVs can operate. The virtual scene may include virtual features that simulate real-world features.

Features may be extracted from the training dataset, the features being variables deemed potentially relevant to the task to be performed by the control model 310. An ordered list of the features may be a feature vector. In some embodiments, the training module 320 may apply dimensionality reduction (e.g., via LDA, PCA, or the like) to reduce the amount of data in the feature vectors to a smaller, more representative set of data. The training module 320 may use supervised machine learning to train the model. Different machine learning techniques—such as linear support vector machine (linear SVM), boosting for other algorithms (e.g., AdaBoost), neutral networks, logistic regression, naïve Bayes, memory-based learning, random forests, bagged trees, decision trees, boosted trees, or boosted stumps—may be used in different embodiments.

In some embodiments, the training module 320 may determine hyperparameters for training the control model 310. Hyperparameters are variables specifying the control model 310 training process. Hyperparameters are different from parameters inside the control model 310 (e.g., weights of filters). In some embodiments, hyperparameters include variables determining the architecture of the control model 310, such as number of hidden layers, etc. Hyperparameters also include variables which determine how the control model 310 is trained, such as batch size, number of epochs, etc. A batch size defines the number of training samples to work through before updating the parameters of the control model 310. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the control model 310. An epoch may include one or more batches. The number of epochs may be 4, 40, 500, 400, or even larger.

The training module 320 may define the architecture of the control model 310, e.g., based on some of the hyperparameters. The architecture of the control model 310 includes an input layer, an output layer, and a plurality of hidden layers. The input layer of the control model 310 may include data from the sensor suite 140, data from the onboard computer 150, or some combination thereof. The output layer may include zone edges, per-point drivability, per-point traffic derivatives, vectorized regions, and so on. The hidden layers are layers between the input layer and output layer. Examples of the hidden layers may include one or more convolutional layers and one or more other types of layers, such as pooling layers, fully connected layers, normalization layers, Softmax or logistic layers, and so on.

After the training module 320 defines the architecture of the control model 310, the training module 320 inputs the training samples into the control model 310. The training module 320 modifies the parameters inside the control model 310 ("internal parameters of the control model 310") to minimize the error between outputs of the control model 310 and the ground-truth labels of the training samples. The internal parameters include weights of filters in the convolutional layers of the control model 310. In some embodiments, the training module 320 uses a cost function to minimize the error.

The training module 320 may train the control model 310 for a predetermined number of epochs. The number of epochs is a hyperparameter that defines the number of times that the deep learning algorithm will work through the entire training dataset. One epoch means that each sample in the training dataset has had an opportunity to update internal parameters of the control model 310. After the training module 320 finishes the predetermined number of epochs, the training module 320 may stop updating the parameters in the control model 310. The control model 310 having the updated parameters is referred to as a trained control model 310.

The evaluation module 330 evaluates performances of the control models 310 after the control models 310 are trained. The evaluation module 330 may use a slice and dice approach to generate sliced data and use the sliced data to evaluate performances of the control models 310. In some embodiments, the evaluation module 330 may conduct a round of performance evaluations on the control models 310 by focusing on a category of environmental condition ("target environmental condition") that can influence AV behaviors. For instance, the evaluation module 330 may evaluate performances of the control models 310 in terms of detecting or predicting the target environmental condition or planning AV behaviors based on the target environmental condition. The evaluation module 330 may conduct multiple rounds of performance evaluations for different target environmental conditions. In the embodiments of FIG. 3, the evaluation module 330 includes a category identifier 350, a data slicer 360, and a performance evaluator 370. In other embodiments, different and/or additional components may be included in the evaluation module 330. Further, functionality attributed to one component of the evaluation module 330 may be accomplished by a different component included in the evaluation module 330.

The category identifier 350 identifies an environmental condition as a target environmental condition based on which the performances of the control models 310 may be evaluated. Additionally or alternatively, the category identifiers 350 may identify one or more environmental features critical to the target environmental condition. In some embodiments, the category identifier 350 may identify an environmental condition or environmental feature based on the confidence of at least one control model 310 on perceiving or predicting the environmental condition or environmental feature. In an example of identifying an environmental condition or environmental feature in an environment, the category identifier 350 may input an input dataset including sensor data capturing the environment into the control model 310. The control model 310 may output a label indicating a category of the environmental condition or environmental feature and a confidence score associated with the label. The confidence score indicates the level of confidence of the control model 310 that the label is correct. The confidence score may indicate a likelihood of the environmental condition or environmental feature falling into the category. The category identifier 350 may select the environmental condition or environmental feature based on a determination that the confidence score is above a threshold value. The category identifier 350 may use the confidence of more than one control model 310 to select an environmental condition or In other embodiments, the category identifier 350 may identify an environmental condition or environmental feature based on a disagreement between at least some of the control models 310. For instance, the category identifier 350 may input an input dataset including sensor data capturing the environment into multiple control models 310. Each control model 310 outputs a label indicating a category of the environmental condition or environmental feature. The category identifier 350 may determine whether the labels generated by the control models 310 are different or not. In embodiments where the labels from different control models 310 are different, the category identifier 350 may select the environmental condition or environmental feature.

In other embodiments, the category identifier 350 may select an environmental condition or environmental feature using other methods. For example, the category identifier 350 may select an environmental condition or environmental feature that one or more AVs failed to perceive or predict correctly, which impaired the performance of the AVs during their driverless operations. The category identifier 350 may determine that an event (e.g., an event indicating an unsafe operation or passenger discomfort) has occurred after the environmental condition or environmental feature was perceived or predicted by an AV. The category identifier 350 may select the environmental condition or environmental feature based on the event. As another example, the category identifier 350 may receive an identification of an environmental condition or environmental feature from a user of the vehicle manager 260.

In embodiments where the category identifier 350 identifies an environmental condition, the category identifier 350 may further identify one or more environmental features based on the environmental condition. An environmental feature may be a feature of an object involved in the environmental condition, such as an object causing the environmental condition. An environmental feature, the detection of which is important to perceiving or predicting the environmental condition, may be critical to the environmental condition. The category identifier 350 may provide one or more identified environmental features to the data slicer 360 for the data slicer 360 to slice data.

The data slicer 360 extracts one or more sub-datasets from a dataset based on an environmental feature provided by the category identifier 350. The dataset may be a set of sensor data detected by an AV from the environment. The dataset may include sensor data captured at different times or locations in the environment. The data slicer 360 may extract one or more sub-datasets that include sensor data sufficiently capturing the environmental feature. In an example, the data slicer 360 may determine a threshold distance for the environmental feature. The threshold distance may be a maximum distance between the environment feature and an AV for the AV to sufficiently capture the environmental feature. The data slicer 340 may slice the dataset based on the threshold distance and extract a sub-dataset that includes sensor data captured by the AV within the threshold distance. In another example, the data slicer 360 may determine a weather condition associated with the environmental feature. The data slicer 340 may slice the dataset based on the threshold distance and extract a sub-dataset that includes sensor data captured by the AV under the weather condition. The data slicer 360 may provide the extracted sub-dataset(s) to the performance evaluator 370.

The performance evaluator 370 receives sub-datasets from the performance evaluator 370 and uses the sub-datasets to evaluate performances of some or all the control models 310. The performance evaluator 370 may input a sub-dataset into the control models 310. Each control model 310 may output a label classifying the environmental feature. In some embodiments, the performance evaluator 370 may compare a ground-truth label of the environmental feature with the labels generated by the control models 310 to evaluate the performances of the control models 310. For instance, the performance evaluator 370 may determine that a control model 310 outputting a label matching the ground-truth label has good performance, versus that a control model 310 outputting a label mismatching the ground-truth label has poor performance. For control models 310 outputting the right label, the performance evaluator 370 may rank the control models 310 based on their confidences. For instance, a control model 310 having a higher confidence in the right label may be ranked higher than a control model having a lower confidence in the right label.

In some embodiments, the performance evaluator 370 may use more than one sub-dataset to evaluate the performances of control models 310. Different sub-datasets may be extracted from datasets generated from different AV operations in the environment. Different AV operations may be of the same AV or different AVs that are managed by the vehicle manager 260. In some embodiments, the performance evaluator 370 may determine a performance score measuring the precision, recall, or a combination of precision and recall of each control model 310. The performance evaluator 370 may use the following metrics to determine the performance score: Precision=TP/(TP+FP) and Recall=TP/(TP+FN), where TP is true positives, FP is false positives, and FN false negatives. The F-score (F-score=2*PR/(P+R)) may unify precision and recall into a single measure, where P is precision and R is recall. The performance evaluator 370 may rank the control models 310 based on their performance scores.

The selection module 340 may select one or more control models 310 based on performance evaluation by the selection module 340. In some embodiments, the selection module 340 may select the control model 310 that has the best performance for classifying an environmental feature, such as a control model 310 having the highest confidence in the right label of the environmental feature or having the highest performance score. In some embodiments, the selection module 340 may select multiple control models 310 for multiple environmental features associated with an environmental condition. The selection module 340 may combine these control models 310.

In some embodiments, the selection module 340 may calibrate the confidence of a selected control model 310. A control model 310 may output multiple labels of the environmental feature, each label may indicate a different classification of the environmental feature. The right label indicates the ground-truth classification of the environmental feature. The control model 310 may have higher confidence in the right label than other labels, in which case the right label is considered as the determination of the control model 310. The selection module 340 may adjust the confidence of the control model in the right label. The selection module 340 may increase the confidence score associated with the right model. For instance, the selection module 340 may change the confidence score from a number lower than 1 (indicating the likelihood that the label is right is less than 100%) to 1 (indicating the likelihood that the label is right is 100%). Additionally or alternatively, the selection module 340 may adjust the confidence of the control model in an incorrect label, e.g., by decreasing the confidence score associated with the incorrect model.

The selection module 340 may provide the one or more control models 310 to AVs for controlling driverless operations. In some embodiments, the selection module 340 may send a control model 310 to an onboard computer of an AV (e.g., the onboard computer 150), and the control model 310 can control an operation of the AV through local inference, i.e., inference run by the onboard computer. In other embodiments, the selection module 340 may make a control model available to an onboard computer of an AV through a network, and the control model 310 can control an operation of the AV through online inference, i.e., inference run by the vehicle manager 260. The onboard computer can receive output of the control model 310 through the network.

Example Sensor Suite

Figure 4:
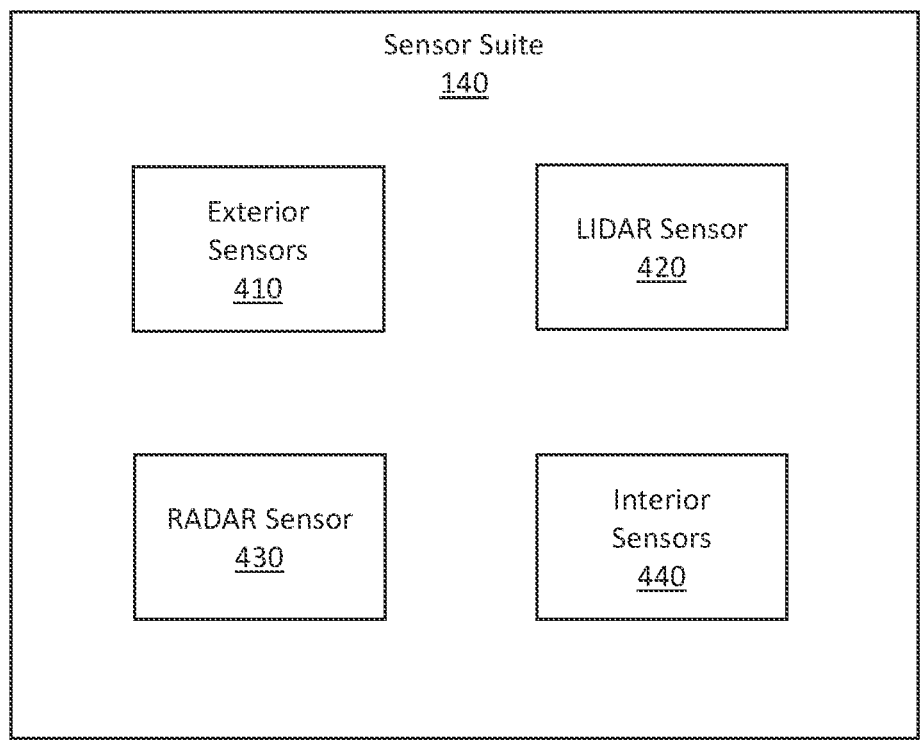
FIG. 4 is a block diagram showing a sensor suite, according to some embodiments of the present disclosure.

FIG. 4 is a block diagram showing the sensor suite 140, according to some embodiments of the present disclosure. The sensor suite 140 may be an onboard sensor suite of an AV, e.g., AV 110 in FIG. 1. The sensor suite 140 includes exterior sensors 410, a LIDAR sensor 420, a RADAR sensor 430, and interior sensors 440. The sensor suite 140 may include any number of the types of sensors shown in FIG. 4, e.g., one or more LIDAR sensors 420, one or more RADAR sensors 430, etc. The sensor suite 140 may have more types of sensors than those shown in FIG. 4, such as the sensors described with respect to FIG. 1. In other embodiments, the sensor suite 140 may not include one or more of the sensors shown in FIG. 4.

The exterior sensors 410 may detect objects in an environment around the AV. The environment may include a scene in which the AV operates. Example objects include objects related to weather (e.g., fog, rain, snow, haze, etc.), persons, buildings, traffic cones, traffic lights, traffic signs, barriers, vehicles, street signs, trees, plants, animals, or other types of objects that may be present in the environment around the AV. In some embodiments, the exterior sensors 410 include exterior cameras having different views, e.g., a front-facing camera, a back-facing camera, and side-facing cameras. One or more exterior sensors 410 may be implemented using a high-resolution imager with a fixed mounting and field of view. One or more exterior sensors 410 may have adjustable field of views and/or adjustable zooms.

In some embodiments, the exterior sensors 410 may operate continually during operation of the AV. In an example embodiment, the exterior sensors 410 capture sensor data (e.g., images, etc.) of a scene in which the AV drives. In other embodiment, the exterior sensors 410 may operate in accordance with an instruction from the onboard computer 150 or an external system, such as the vehicle manager 260 of the fleet management system 120. For instance, the onboard computer 150 or vehicle manager 260 may request the exterior sensors 410 to detect environmental features and to generate sensor data that can be used for detecting or predicting environmental conditions or for evaluating performances of control models. Some of all of the exterior sensors 410 may capture sensor data of one or more objects in an environment surrounding the AV based on the instruction.

The LIDAR sensor 420 may measure distances to objects in the vicinity of the AV using reflected laser light. The LIDAR sensor 420 may be a scanning LIDAR that provides a point cloud of the region scanned. The LIDAR sensor 420 may have a fixed field of view or a dynamically configurable field of view. The LIDAR sensor 420 may produce a point cloud that describes, among other things, distances to various objects in the environment of the AV.

The RADAR sensor 430 may measure ranges and speeds of objects in the vicinity of the AV using reflected radio waves. The RADAR sensor 430 may be implemented using a scanning RADAR with a fixed field of view or a dynamically configurable field of view. The RADAR sensor 430 may include one or more articulating RADAR sensors, long-range RADAR sensors, short-range RADAR sensors, or some combination thereof.

The interior sensors 440 may detect the interior of the AV, such as objects inside the AV. Example objects inside the AV include passengers, client devices of passengers, components of the AV, items delivered by the AV, items facilitating services provided by the AV, and so on. The interior sensors 440 may include multiple interior cameras to capture different views, e.g., to capture views of an object inside the AV. The interior sensors 440 may be implemented with a fixed mounting and fixed field of view, or the interior sensors 440 may have adjustable field of views and/or adjustable zooms, e.g., to focus on one or more interior features of the AV. The interior sensors 440 may transmit sensor data to a perception module (such as the perception module 530 described below in conjunction with FIG. 5), which can use the sensor data to classify a feature and/or to determine a status of a feature.

In some embodiments, the interior sensors 440 include one or more input sensors that allow passengers to provide input. For instance, a passenger may use an input sensor to provide feedback on AV behaviors during the ride. The input sensors may include touch screen, microphone, keyboard, mouse, or other types of input devices. In an example, the interior sensors 440 include a touch screen that is controlled by the onboard computer 150. The onboard computer 150 may present messages on the touch screen and receive interaction of the passenger with the messages through the touch screen. A message may include information of one or more undesirable AV behaviors in the ride. In some embodiments, some or all of the interior sensors 440 may operate continually during operation of the AV. In other embodiment, some or all of the interior sensors 440 may operate in accordance with an instruction from the onboard computer 150 or an external system, such as the fleet management system 120.

Example Onboard Computer

Figure 5:
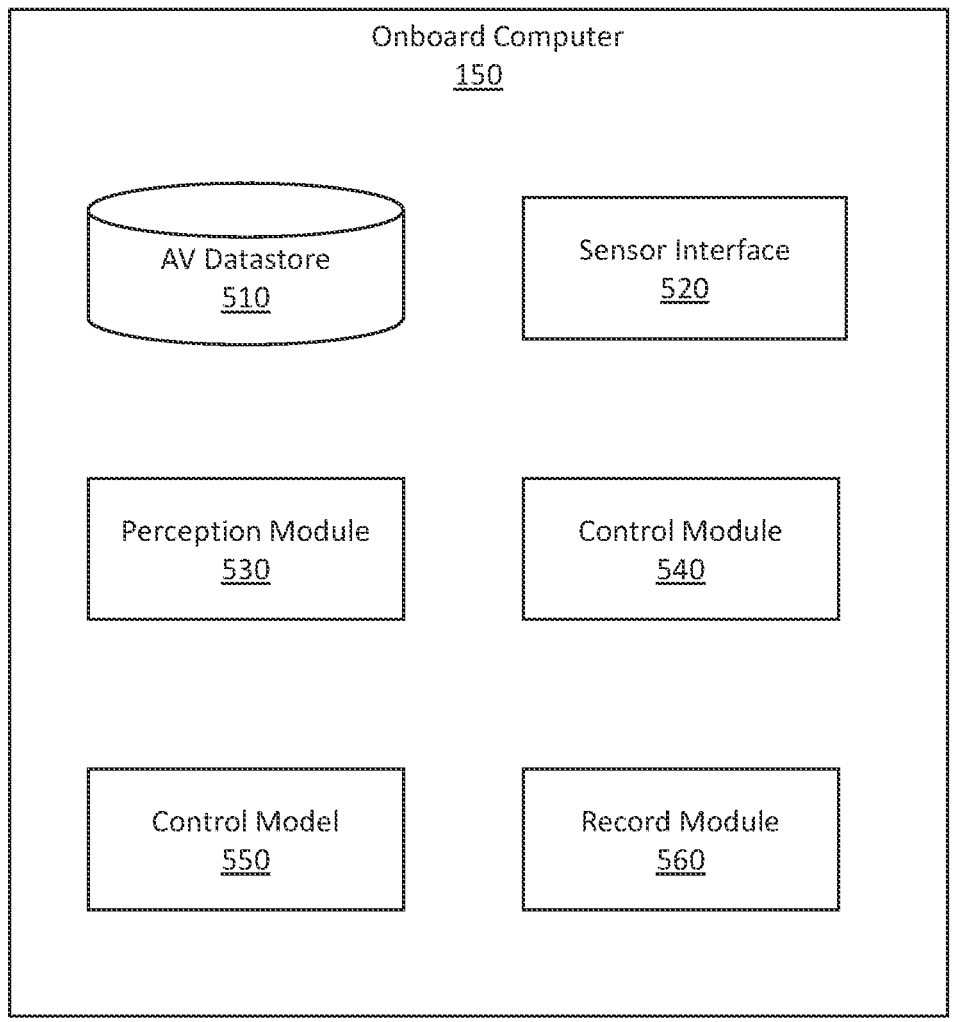
FIG. 5 is a block diagram showing an onboard computer, according to some embodiments of the present disclosure.

FIG. 5 is a block diagram showing the onboard computer 150 according to some embodiments of the present disclosure. The onboard computer 150 may control an AV, e.g., AV 110 in FIG. 1. As shown in FIG. 5, the onboard computer 150 includes an AV datastore 510, a sensor interface 520, a perception module 530, a control module 540, a control model 550, and a record module 560. In alternative configurations, fewer, different and/or additional components may be included in the onboard computer 150. For example, the onboard computer 150 may include more than one control model 550. As another example, components and modules for conducting route planning, controlling movements of the AV, and other vehicle functions are not shown in FIG. 5. Further, functionality attributed to one component of the onboard computer 150 may be accomplished by a different component included in the onboard computer 150 or a different system, such as the fleet management system 120.

The AV datastore 510 stores data associated with operations of the AV. The AV datastore 510 may store one or more operation records of the AV. An operation record is a record of an operation of the AV, e.g., an operation for providing a ride service. The operation may be a currently performed operation or a previously performed operation ("previous operation" or "historical operation"). The operation record may include information indicating operational behaviors of the AV during the operation. The operational behaviors may include sensor detection, movement, stop, battery charging, calibration, maintenance, communication with the fleet management system 120, communication with assistance agent, communication with user, communication with another AV, and so on. The operations record may also include data used, received, or captured by the AV during the operation, such as map data, instructions from the fleet management system 120, sensor data captured by the AV's sensor suite, and so on. In some embodiments, the AV datastore 510 stores a detailed map that includes a current environment of the AV. The AV datastore 510 may store data in the map datastore 250. In some embodiments, the AV datastore 510 stores a subset of the map datastore 250, e.g., map data for a city or region in which the AV is located.

The data in the AV datastore 510 may include data generated by the AV itself. The data may include sensor data capturing one or more environments where the AV operates, e.g., operates to provide services. The sensor data may be from the sensor suite 140 of the AV. The data in the AV datastore 510 may also include perception data that identifies one or more environmental conditions. The perfection data may be from the perception module 530 of the onboard computer 150 of the AV. The data may also include external data, e.g., data from other AVs or systems. For example, the data in the AV datastore 510 may include data (e.g., sensor data, perception, etc.) from one or more other AVs that capture one or more environments where the other AVs operate. As another example, the data in the AV datastore 510 may include data from the fleet management system 120, e.g., data about environmental conditions, instructions (e.g., operational plans) from the vehicle manager 260, etc. In yet another example, the data in the AV datastore 510 may include data from one or more third-party systems that provide information of environments where the AV operates. The AV may be in communication with the one or more third-party systems, e.g., through a network.

The sensor interface 520 interfaces with the sensors in the sensor suite 140. The sensor interface 520 may request data from the sensor suite 140, e.g., by requesting that a sensor capture data in a particular direction or at a particular time. For example, the sensor interface 520 instructs the sensor suite 140 to capture sensor data of an environment surrounding the AV, e.g., by sending a request for sensor data to the sensor suite 140. In some embodiments, the request for sensor data may specify which sensor(s) in the sensor suite 140 to provide the sensor data, and the sensor interface 520 may request the sensor(s) to capture data. The request may further provide one or more settings of a sensor, such as orientation, resolution, accuracy, focal length, and so on. The sensor interface 520 can request the sensor to capture data in accordance with the one or more settings.

A request for sensor data may be a request for real-time sensor data, and the sensor interface 520 can instruct the sensor suite 140 to immediately capture the sensor data and to immediately send the sensor data to the sensor interface 520. The sensor interface 520 is configured to receive data captured by sensors of the sensor suite 140, including data from exterior sensors mounted to the outside of the AV, and data from interior sensors mounted in the passenger compartment of the AV. The sensor interface 520 may have subcomponents for interfacing with individual sensors or groups of sensors of the sensor suite 140, such as a camera interface, a LIDAR interface, a RADAR interface, a microphone interface, etc.

The perception module 530 identifies objects and/or other features captured by the sensors of the AV. The perception module 530 may identify objects inside the AV based on sensor data captured by one or more interior sensors (e.g., the interior sensors 440). For instance, the perception module 530 may identify one or more passengers in the AV. In some embodiments, the perception module 530 identifies objects in the environment of the AV and captured by one or more sensors (e.g., the exterior sensors 410, LIDAR sensor 420, RADAR sensor 430, etc.). As another example, the perception module 530 determines one or more environmental conditions based on sensor data from one or more sensors (e.g., the exterior sensors 410, LIDAR sensor 420, RADAR sensor 430, etc.).

The perception module 530 may include one or more classifiers trained using machine learning to identify particular objects. For example, a multi-class classifier may be used to classify each object in the AV or in the environment of the AV as one of a set of potential objects, e.g., a passenger, a vehicle, a pedestrian, or a cyclist. As another example, a passenger classifier recognizes passengers in the AV, a pedestrian classifier recognizes pedestrians in the environment of the AV, a vehicle classifier recognizes vehicles in the environment of the AV, etc. The perception module 530 may identify facial expressions of people, such as passengers, e.g., based on data from interior cameras. The perception module 530 may identify travel speeds of identified objects based on data from the RADAR sensor 430, e.g., speeds at which other vehicles, pedestrians, or birds are traveling. As another example, the perception module 53—may identify distances to identified objects based on data (e.g., a captured point cloud) from the LIDAR sensor 420, e.g., a distance to a particular vehicle, building, or other feature identified by the perception module 530. The perception module 530 may also identify other features or characteristics of objects in the environment of the AV based on image data or other sensor data, e.g., colors (e.g., the colors of Christmas lights), sizes (e.g., heights of people or buildings in the environment), makes and models of vehicles, pictures and/or words on billboards, etc.

In some embodiments, the perception module 530 fuses data from one or more interior sensors 440 with data from exterior sensors (e.g., exterior sensors 410) and/or AV datastore 510 to identify environmental objects that one or more users are looking at. The perception module 530 determines, based on an image of a user, a direction in which the user is looking, e.g., a vector extending from the user and out of the AV in a particular direction. The perception module 530 compares this vector to data describing features in the environment of the AV, including the features' relative location to the AV (e.g., based on real-time data from exterior sensors and/or the AV's real-time location) to identify a feature in the environment that the user is looking at.

While a single perception module 530 is shown in FIG. 5, in some embodiments, the onboard computer 150 may have multiple perception modules, e.g., different perception modules for performing different ones of the perception tasks described above (e.g., object perception, speed perception, distance perception, feature perception, facial recognition, mood determination, sound analysis, gaze determination, etc.).

The control module 540 controls operations of the AV, e.g., based on information from the sensor interface 520 or the perception module 530. In some embodiments, the control module 540 controls operation of the AV by using the control model 550. The control model 550 may be trained and selected by the vehicle manager 260. Even though FIG. 5 shows a single control model, the control module 540 may use multiple control models to control operations of the AV. The control model 550 may be updated or replaced by one or more new control models over time.

The control module 540 may provide input data to the control model 550, and the control model 550 outputs operation parameters for the AV. The input data may include sensor data from the sensor interface 520 (which may indicate a current state of the AV), objects identified by the perception module 530, data from the fleet management system 120, other data, or some combination thereof. The operation parameters are parameters indicating operation to be performed by the AV. The operation of the AV may include perception, prediction, planning, localization, motion, navigation, other types of operation, or some combination thereof.

The control module 540 may provide instructions to various components of the AV based on the output of the control model, and these components of the AV will operate in accordance with the instructions. In an example where the output of the control model indicates that a change of traveling speed of the AV is required given a prediction of traffic condition, the control module 540 may instruct the motor of the AV to change the traveling speed of the AV. In another example where the output of the control model indicates a need to detect characteristics of an object in the environment around the AV (e.g., detect a speed limit), the control module 540 may instruct the sensor suite 140 to capture an image of the speed limit sign with sufficient resolution to read the speed limit and instruct the perception module 530 to identify the speed limit in the image.

The record module 560 generates operation records of the AV and stores the operations records in the AV datastore 510. The record module 560 may generate an operation record in accordance with an instruction from the fleet management system 120, e.g., the vehicle manager 260. The instruction may specify data to be included in the operation record. The record module 560 may determine one or more timestamps for an operation record. In an example of an operation record for a ride service, the record module 560 may generate timestamps indicating the time when the ride service starts, the time when the ride service ends, times of specific AV behaviors associated with the ride service, and so on. The record module 560 can transmit the operation record to the fleet management system 120.

Example Method of Evaluating Control Models

Figure 6:
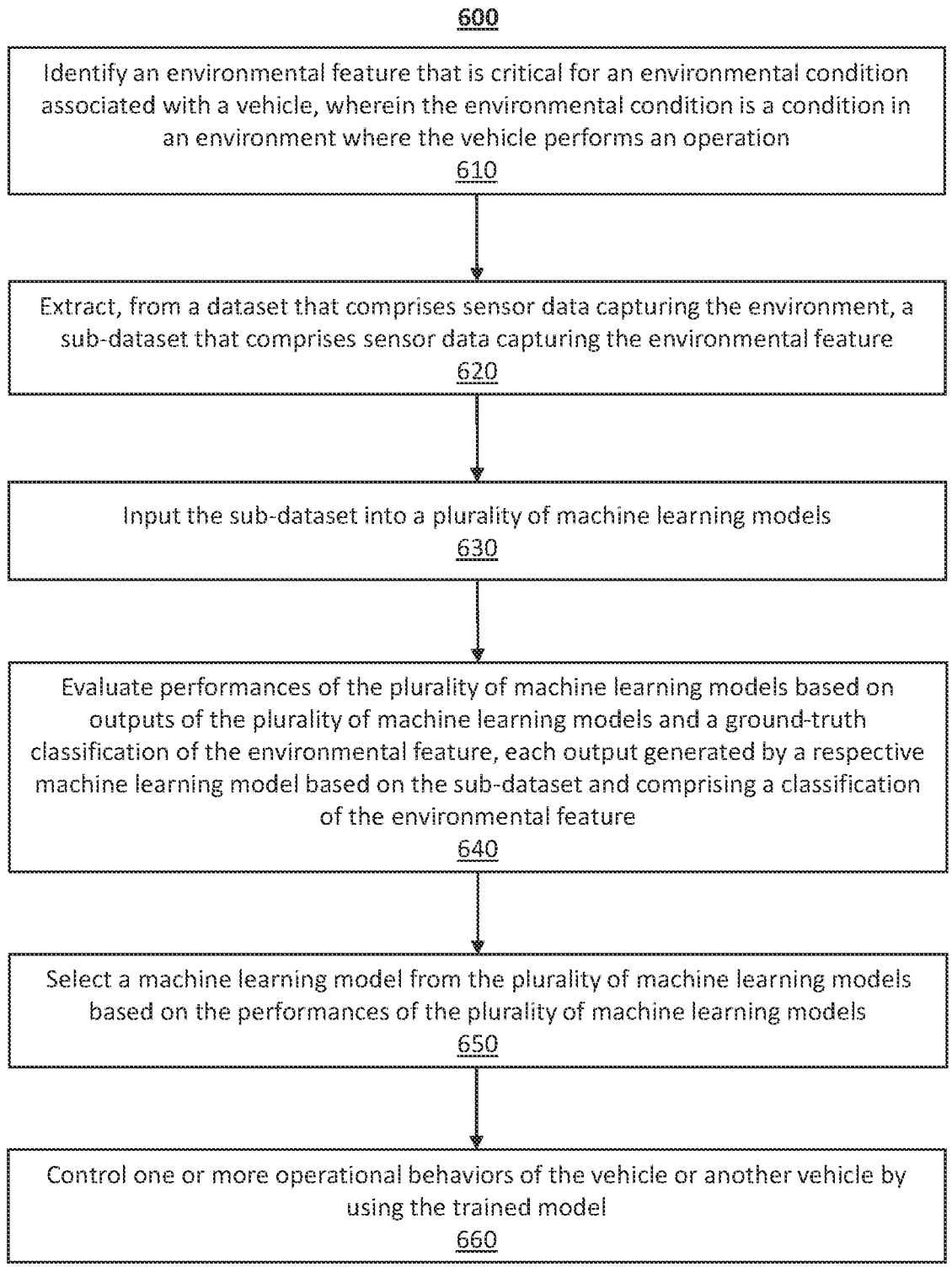
FIG. 6 is a flowchart showing a method of evaluating control models, according to some embodiments of the present disclosure.

FIG. 6 is a flowchart showing a method 600 of vehicle-human communication, according to some embodiments of the present disclosure. The method 600 may be performed by the vehicle manager 260. Although the method 600 is described with reference to the flowchart illustrated in FIG. 6, many other methods of vehicle-human communication may alternatively be used. For example, the order of execution of the steps in FIG. 6 may be changed. As another example, some of the steps may be changed, eliminated, or combined.

The vehicle manager 260 identifies 610 an environmental feature that is critical for an environmental condition associated with a vehicle. The environmental condition is a condition in an environment where the vehicle performs an operation. The environmental feature may be a feature of an object associated with the environmental condition. The environmental feature may be a visual feature.

In an embodiment, the vehicle manager 260 inputs the dataset into at least one of the plurality of machine learning models that outputs a label indicating a category of the environmental feature and a confidence score associated with the label. The confidence score indicates a likelihood of the environmental feature falling into the category. The vehicle manager 260 identifies the environmental feature based on the confidence score. The vehicle manager 260 may determine that the confidence score is above a threshold confidence score.

In another embodiment, the vehicle manager 260 inputs the dataset into the plurality of machine learning models. The plurality of machine learning models outputs different classifications of the environmental feature. In yet another embodiment, the vehicle manager 260 identifies the environmental feature based on an event that occurs during the operation of the vehicle in the environment after the environmental feature is detected by the vehicle.

The vehicle manager 260 extracts 620, from a dataset that comprises sensor data capturing the environment, a sub-dataset that comprises sensor data capturing the environmental feature. In some embodiments, the vehicle manager 260 identifies the sub-dataset from the dataset based on a distance between the vehicle and the environmental feature at a time when the sensor data capturing the environmental feature is captured. In some embodiments, the distance is no greater than a predetermined distance. In other embodiments, the vehicle manager 260 identifies the sub-dataset from the dataset based on a weather condition in the environment at a time when the sensor data capturing the environmental feature is captured.

The vehicle manager 260 inputs 630 the sub-dataset into a plurality of machine learning models. A machine learning model may be a control model 310 in FIG. 3. In some embodiments, each of the plurality of machine learning models comprises a first classifier for classifying the environmental feature and a second classifier for classifying an additional environmental feature. The vehicle manager 260 extracts, from the dataset, an additional sub-dataset that comprises sensor data capturing the additional environmental feature. The vehicle manager 260 inputs the additional sub-dataset into a plurality of machine learning models.

Each respective machine learning model outputs a classification of the additional environmental feature.

The vehicle manager 260 evaluates 640 performances of the plurality of machine learning models based on outputs of the plurality of machine learning models and a ground-truth classification of the environmental feature. Each output is generated by a respective machine learning model based on the sub-dataset and comprises a classification of the environmental feature. In embodiments where the vehicle manager 260 inputs the additional sub-dataset into a plurality of machine learning models, the vehicle manager evaluates performances of the plurality of machine learning models based on outputs of the machine learning models, a ground-truth classification of the environmental feature, and a ground-truth classification of the additional environmental feature.

The vehicle manager 260 selects 650 a machine learning model from the plurality of machine learning models based on the performances of the plurality of machine learning models. In some embodiments, the vehicle manager 260 calibrates the confidence of the machine learning model based on the performances of the plurality of machine learning models.

The vehicle manager 260 controls 660 one or more operational behaviors of the vehicle or another vehicle by using the machine learning model. The vehicle manager 260 may provide the machine learning model to an onboard computer of a vehicle (e.g., the onboard computer 150) that can control the one or more operational behaviors of the vehicle based on an online inference or local inference of the machine learning model.

Select Examples

Example 1 provides a method, including identifying an environmental feature that is critical for an environmental condition associated with a vehicle, where the environmental condition is a condition in an environment where the vehicle performs an operation; extracting, from a dataset that includes sensor data capturing the environment, a sub-dataset that includes sensor data capturing the environmental feature; inputting the sub-dataset into a plurality of machine learning models; evaluating performances of the plurality of machine learning models based on outputs of the plurality of machine learning models and a ground-truth classification of the environmental feature, each output generated by a respective machine learning model based on the sub-dataset and comprising a classification of the environmental feature; selecting a machine learning model from the plurality of machine learning models based on the performances of the plurality of machine learning models; and controlling one or more operational behaviors of the vehicle or another vehicle by using the machine learning model.

Example 2 provides the method of example 1, where identifying the environmental feature that is critical for an environmental condition associated with the vehicle includes inputting the dataset into at least one of the plurality of machine learning models that outputs a label indicating a category of the environmental feature and a confidence score associated with the label, the confidence score indicating a likelihood of the environmental feature falling into the category; and identifying the environmental feature based on the confidence score.

Example 3 provides the method of example 2, where identifying the environmental feature based on the confidence score includes determining that the confidence score is above a threshold confidence score.

Example 4 provides the method of any of the preceding examples, where identifying the environmental feature that is critical for an environmental condition associated with the vehicle includes inputting the dataset into the plurality of machine learning models, the plurality of machine learning models outputting different classifications of the environmental feature.

Example 5 provides the method of any of the preceding examples, where identifying the environmental feature that is critical for an environmental condition associated with the vehicle includes identifying the environmental feature based on an event that occurs during the operation of the vehicle in the environment after the environmental feature is detected by the vehicle.

Example 6 provides the method of any of the preceding examples, where extracting, from the dataset that includes the sensor data capturing the environment, the sub-dataset that includes the sensor data capturing the environmental feature includes identifying the sub-dataset from the dataset based on a distance between the vehicle and the environmental feature at a time when the sensor data capturing the environmental feature is captured.

Example 7 provides the method of example 6, where the distance is no greater than a predetermined distance.

Example 8 provides the method of any of the preceding examples, where extracting, from the dataset that includes the sensor data capturing the environment, the sub-dataset that includes the sensor data capturing the environmental feature includes identifying the sub-dataset from the dataset based on a weather condition in the environment at a time when the sensor data capturing the environmental feature is captured.

Example 9 provides the method of any of the preceding examples, where each of the plurality of machine learning models includes a first classifier for classifying the environmental feature and a second classifier for classifying an additional environmental feature, and the method further includes extracting, from the dataset, an additional sub-dataset that includes sensor data capturing the additional environmental feature; inputting the additional sub-dataset into a plurality of machine learning models, each respective machine learning model outputting a classification of the additional environmental feature; and evaluating performances of the plurality of machine learning models based on outputs of the machine learning models, a ground-truth classification of the environmental feature, and a ground-truth classification of the additional environmental feature.

Example 10 provides the method of any of the preceding examples, further including calibrating a confidence of the machine learning model based on the performances of the plurality of machine learning models.

Example 11 provides one or more non-transitory computer-readable media storing instructions executable to perform operations, the operations including identifying an environmental feature that is critical for an environmental condition associated with a vehicle, where the environmental condition is a condition in an environment where the vehicle performs an operation; extracting, from a dataset that includes sensor data capturing the environment, a sub-dataset that includes sensor data capturing the environmental feature; inputting the sub-dataset into a plurality of machine learning models; evaluating performances of the plurality of machine learning models based on outputs of the plurality of machine learning models and a ground-truth classification of the environmental feature, each output generated by a respective machine learning model based on the sub-dataset and comprising a classification of the environmental feature;

selecting a machine learning model from the plurality of machine learning models based on the performances of the plurality of machine learning models; and controlling one or more operational behaviors of the vehicle or another vehicle by using the machine learning model.

Example 12 provides the one or more non-transitory computer-readable media of example 11, where identifying the environmental feature that is critical for an environmental condition associated with the vehicle includes inputting the dataset into at least one of the plurality of machine learning models that outputs a label indicating a category of the environmental feature and a confidence score associated with the label, the confidence score indicating a likelihood of the environmental feature falling into the category; and identifying the environmental feature based on the confidence score.

Example 13 provides the one or more non-transitory computer-readable media of example 11 or 12, where identifying the environmental feature that is critical for an environmental condition associated with the vehicle includes inputting the dataset into the plurality of machine learning models, the plurality of machine learning models outputting different classifications of the environmental feature.

Example 14 provides the one or more non-transitory computer-readable media of any one of examples 11-13, where identifying the environmental feature that is critical for an environmental condition associated with the vehicle includes identifying the environmental feature based on an event that occurs during the operation of the vehicle in the environment after the environmental feature is detected by the vehicle.

Example 15 provides the one or more non-transitory computer-readable media of any one of examples 11-14, where extracting, from the dataset that includes the sensor data capturing the environment, the sub-dataset that includes the sensor data capturing the environmental feature includes identifying the sub-dataset from the dataset based on a distance between the vehicle and the environmental feature at a time when the sensor data capturing the environmental feature is captured.

Example 16 provides the one or more non-transitory computer-readable media of any one of examples 11-15, where extracting, from the dataset that includes the sensor data capturing the environment, the sub-dataset that includes the sensor data capturing the environmental feature includes identifying the sub-dataset from the dataset based on a weather condition in the environment at a time when the sensor data capturing the environmental feature is captured.

Example 17 provides the one or more non-transitory computer-readable media of any one of examples 11-16, where each of the plurality of machine learning models includes a first classifier for classifying the environmental feature and a second classifier for classifying an additional environmental feature, and the operations further include extracting, from the dataset, an additional sub-dataset that includes sensor data capturing the additional environmental feature; inputting the additional sub-dataset into a plurality of machine learning models, each respective machine learning model outputting a classification of the additional environmental feature; and evaluating performances of the plurality of machine learning models based on outputs of the machine learning models, a ground-truth classification of the environmental feature, and a ground-truth classification of the additional environmental feature.

Example 18 provides a computer system, including a computer processor for executing computer program instructions; and one or more non-transitory computer-readable media storing computer program instructions executable by the computer processor to perform operations including identifying an environmental feature that is critical for an environmental condition associated with a vehicle, where the environmental condition is a condition in an environment where the vehicle performs an operation, extracting, from a dataset that includes sensor data capturing the environment, a sub-dataset that includes sensor data capturing the environmental feature, inputting the sub-dataset into a plurality of machine learning models, evaluating performances of the plurality of machine learning models based on outputs of the plurality of machine learning models and a ground-truth classification of the environmental feature, each output generated by a respective machine learning model based on the sub-dataset and comprising a classification of the environmental feature, selecting a machine learning model from the plurality of machine learning models based on the performances of the plurality of machine learning models, and controlling one or more operational behaviors of the vehicle or another vehicle by using the machine learning model.

Example 19 provides the computer system of example 18, where identifying the environmental feature that is critical for an environmental condition associated with the vehicle includes inputting the dataset into at least one of the plurality of machine learning models that outputs a label indicating a category of the environmental feature and a confidence score associated with the label, the confidence score indicating a likelihood of the environmental feature falling into the category; and identifying the environmental feature based on the confidence score.

Example 20 provides the computer system of example 18 or 19, where extracting, from the dataset that includes the sensor data capturing the environment, the sub-dataset that includes the sensor data capturing the environmental feature includes identifying the sub-dataset from the dataset based on a distance between the vehicle and the environmental feature at a time when the sensor data capturing the environmental feature is captured.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method, comprising:
   identifying an environmental feature that is critical for an environmental condition associated with a vehicle, wherein the environmental condition is a condition in an environment where the vehicle performs an operation;
   extracting, from a dataset that comprises sensor data capturing the environment, a sub-dataset that comprises sensor data capturing the environmental feature;
   inputting the sub-dataset into a plurality of machine learning models;
   evaluating performances of the plurality of machine learning models based on outputs of the plurality of machine learning models and a ground-truth classification of the environmental feature, each output generated by a respective machine learning model based on the sub-dataset and comprising a classification of the environmental feature, wherein the ground-truth classification of the environmental feature is a verified accurate classification of the environmental feature;
   selecting a machine learning model from the plurality of machine learning models based on the performances of the plurality of machine learning models; and
   controlling one or more operational behaviors of the vehicle or another vehicle by using the selected machine learning model.

2. The method of claim 1, wherein identifying the environmental feature that is critical for an environmental condition associated with the vehicle comprises:
   inputting the dataset into at least one of the plurality of machine learning models that outputs a label indicating a category of the environmental feature and a confidence score associated with the label, the confidence score indicating a likelihood of the environmental feature falling into the category; and
   identifying the environmental feature based on the confidence score.

3. The method of claim 2, wherein identifying the environmental feature based on the confidence score comprises:
   determining that the confidence score is above a threshold confidence score.

4. The method of claim 1, wherein the plurality of machine learning models includes a plurality of distinct machine learning models, and wherein identifying the environmental feature that is critical for an environmental condition associated with the vehicle comprises:
   inputting the dataset into the plurality of machine learning models, the plurality of machine learning models outputting different classifications of the environmental feature.

5. The method of claim 1, wherein identifying the environmental feature that is critical for an environmental condition associated with the vehicle comprises:
   identifying the environmental feature based on an event that occurs during the operation of the vehicle in the environment after the environmental feature is detected by the vehicle.

6. The method of claim 1, wherein extracting, from the dataset that comprises the sensor data capturing the environment, the sub-dataset that comprises the sensor data capturing the environmental feature comprises:
   identifying the sub-dataset from the dataset based on a distance between the vehicle and the environmental feature at a time when the sensor data capturing the environmental feature is captured.

7. The method of claim 6, wherein the distance is no greater than a predetermined distance.

8. The method of claim 1, wherein extracting, from the dataset that comprises the sensor data capturing the environment, the sub-dataset that comprises the sensor data capturing the environmental feature comprises:
   identifying the sub-dataset from the dataset based on a weather condition in the environment at a time when the sensor data capturing the environmental feature is captured.

9. The method of claim 1, wherein each of the plurality of machine learning models comprises a first classifier for classifying the environmental feature and a second classifier for classifying an additional environmental feature, and the method further comprises:

extracting, from the dataset, an additional sub-dataset that comprises sensor data capturing the additional environmental feature;

inputting the additional sub-dataset into a plurality of machine learning models, each respective machine learning model outputting a classification of the additional environmental feature; and evaluating performances of the plurality of machine learning models based on outputs of the machine learning models, a ground-truth classification of the environmental feature, and a ground-truth classification of the additional environmental feature.

10. The method of claim 1, further comprising:
calibrating a confidence of the machine learning model based on the performances of the plurality of machine learning models.

11. One or more non-transitory computer-readable media storing instructions executable to perform operations, the operations comprising:

identifying an environmental feature that is critical for an environmental condition associated with a vehicle, wherein the environmental condition is a condition in an environment where the vehicle performs an operation;

extracting, from a dataset that comprises sensor data capturing the environment, a sub-dataset that comprises sensor data capturing the environmental feature;

inputting the sub-dataset into a plurality of machine learning models;

evaluating performances of the plurality of machine learning models based on outputs of the plurality of machine learning models and a ground-truth classification of the environmental feature, each output generated by a respective machine learning model based on the sub-dataset and comprising a classification of the environmental feature, wherein the ground-truth classification of the environmental feature is a verified accurate classification of the environmental feature;

selecting a machine learning model from the plurality of machine learning models based on the performances of the plurality of machine learning models; and controlling one or more operational behaviors of the vehicle or another vehicle by using the selected machine learning model.

12. The one or more non-transitory computer-readable media of claim 11, wherein identifying the environmental feature that is critical for an environmental condition associated with the vehicle comprises:

inputting the dataset into at least one of the plurality of machine learning models that outputs a label indicating a category of the environmental feature and a confidence score associated with the label, the confidence score indicating a likelihood of the environmental feature falling into the category; and identifying the environmental feature based on the confidence score.

13. The one or more non-transitory computer-readable media of claim 11, wherein the plurality of machine learning models includes a plurality of distinct machine learning models, and wherein identifying the environmental feature that is critical for an environmental condition associated with the vehicle comprises:

inputting the dataset into the plurality of machine learning models, the plurality of machine learning models outputting different classifications of the environmental feature.

14. The one or more non-transitory computer-readable media of claim 11, wherein identifying the environmental feature that is critical for an environmental condition associated with the vehicle comprises:

identifying the environmental feature based on an event that occurs during the operation of the vehicle in the environment after the environmental feature is detected by the vehicle.

15. The one or more non-transitory computer-readable media of claim 11, wherein extracting, from the dataset that comprises the sensor data capturing the environment, the sub-dataset that comprises the sensor data capturing the environmental feature comprises:

identifying the sub-dataset from the dataset based on a distance between the vehicle and the environmental feature at a time when the sensor data capturing the environmental feature is captured.

16. The one or more non-transitory computer-readable media of claim 11, wherein extracting, from the dataset that comprises the sensor data capturing the environment, the sub-dataset that comprises the sensor data capturing the environmental feature comprises:

identifying the sub-dataset from the dataset based on a weather condition in the environment at a time when the sensor data capturing the environmental feature is captured.

17. The one or more non-transitory computer-readable media of claim 11, wherein each of the plurality of machine learning models comprises a first classifier for classifying the environmental feature and a second classifier for classifying an additional environmental feature, and the operations further comprise:

extracting, from the dataset, an additional sub-dataset that comprises sensor data
capturing the additional environmental feature;

inputting the additional sub-dataset into a plurality of machine learning models, each respective machine learning model outputting a classification of the additional environmental feature; and evaluating performances of the plurality of machine learning models based on outputs of the machine learning models, a ground-truth classification of the environmental feature, and a ground-truth classification of the additional environmental feature.

18. A computer system, comprising:
a computer processor for executing computer program instructions; and one or more non-transitory computer-readable media storing computer program instructions executable by the computer processor to perform operations comprising:

identifying an environmental feature that is critical for an environmental condition associated with a vehicle, wherein the environmental condition is a condition in an environment where the vehicle performs an operation, extracting, from a dataset that comprises sensor data capturing the environment, a sub-dataset that comprises sensor data capturing the environmental feature, inputting the sub-dataset into a plurality of machine learning models, evaluating performances of the plurality of machine learning models based on outputs of the plurality of machine learning models and a ground-truth classification of the environmental feature, wherein the ground-truth classification of the environmental feature is a verified accurate classification of the environmental feature, each output generated by a respective machine learning model based on the sub-dataset and comprising a classification of the environmental feature, selecting a machine learning model from the plurality of machine learning models based on the performances of the plurality of machine learning models, and controlling one or more operational behaviors of the vehicle or another vehicle by using the selected machine learning model.

19. The computer system of claim 18, wherein identifying the environmental feature that is critical for an environmental condition associated with the vehicle comprises:

inputting the dataset into at least one of the plurality of machine learning models that outputs a label indicating a category of the environmental feature and a confidence score associated with the label, the confidence score indicating a likelihood of the environmental feature falling into the category; and identifying the environmental feature based on the confidence score.

20. The computer system of claim 18, wherein extracting, from the dataset that comprises the sensor data capturing the environment, the sub-dataset that comprises the sensor data capturing the environmental feature comprises:

identifying the sub-dataset from the dataset based on a distance between the vehicle and the environmental feature at a time when the sensor data capturing the environmental feature is captured.

* * * * *